United States Patent [19]

Kan

[11] Patent Number: 5,355,508
[45] Date of Patent: Oct. 11, 1994

[54] PARALLEL DATA PROCESSING SYSTEM COMBINING A SIMD UNIT WITH A MIMD UNIT AND SHARING A COMMON BUS, MEMORY, AND SYSTEM CONTROLLER

[75] Inventor: Takashi Kan, Kanagawa, Japan

[73] Assignee: Mitsubishi Denki Kabushiki Kaisha, Tokyo, Japan

[21] Appl. No.: 793,353

[22] PCT Filed: May 7, 1991

[86] PCT No.: PCT/JP91/00604
§ 371 Date: Jan. 6, 1992
§ 102(e) Date: Jan. 6, 1992

[87] PCT Pub. No.: WO91/17507
PCT Pub. Date: Nov. 14, 1991

[30] Foreign Application Priority Data

May 7, 1990 [JP] Japan ................................ 2-117262

[51] Int. Cl.$^5$ .................... G06F 13/36; G06F 15/80
[52] U.S. Cl. ......................... 395/800; 364/229.4; 364/228.7; 364/231.9; 364/DIG. 1
[58] Field of Search ............... 395/800, 550, 425, 375

[56] References Cited

U.S. PATENT DOCUMENTS 4,858,110  8/1989  Miyata ................................ 395/550
5,239,654  8/1993  Ing-Simmons et al. ............ 395/800

FOREIGN PATENT DOCUMENTS 63-142445  6/1988  Japan .
126108     5/1989  Japan .

OTHER PUBLICATIONS

"Highly Parallel Computing", pp. 111-112 of Ch. 4.12 Classification, pp. 477-488 of Ch. 11 Hybrid Parallel Architecture, 1989.
"The Third Symposium of the Frontiers of Massively Parallel Computation", pp. 397-406 Oct. 8-10, 1990.
"Data Management and Control-Flow Constructs in a SIMD/SPMD Parallel Language/Compiler", Nichols et al.

Primary Examiner—Alyssa H. Bowler
Assistant Examiner—John Harrity
Attorney, Agent, or Firm—Wolf, Greenfield & Sacks

[57] ABSTRACT

There are SIMD type parallel data processing systems having a single instruction stream and multiple data streams and MIMD type parallel data processing systems having multiple instruction and data streams in the parallel data processing field for performing high-speed data processing. They have both merits and demerits and each have their suitable application fields. Because of this, it is extremely difficult to cover a wide range of application fields with either one of the systems. Then, a SIMD type parallel processing unit (50) and a MIMD type parallel data processing unit (51) are connected to each other by a common bus (41) and a memory (42), and a system controller (43) is provided to allow each of the parallel data processing units to perform its suitable processings, thus making it possible to apply the optimum parallel processing system to a wide range of application fields. That is, simple processings of a large volume of data are allocated to the SIMD type parallel data processing unit, while complex processings of a small volume of data are allocated to the MIMD type parallel data processing unit, whereby processings which have been difficult for a conventional computer to accomplish within an effective time, such as large-scale and complex processings of images, can be performed within a practical time at a high speed.

25 Claims, 5 Drawing Sheets

PARALLEL DATA PROCESSING SYSTEM COMBINING A SIMD UNIT WITH A MIMD UNIT AND SHARING A COMMON BUS, MEMORY, AND SYSTEM CONTROLLER

BACKGROUND OF THE INVENTION

1. Field of the Invention

The present invention relates to a parallel data processing field for performing high-speed data processing.

2. Description of the Prior Art

Figure 4:
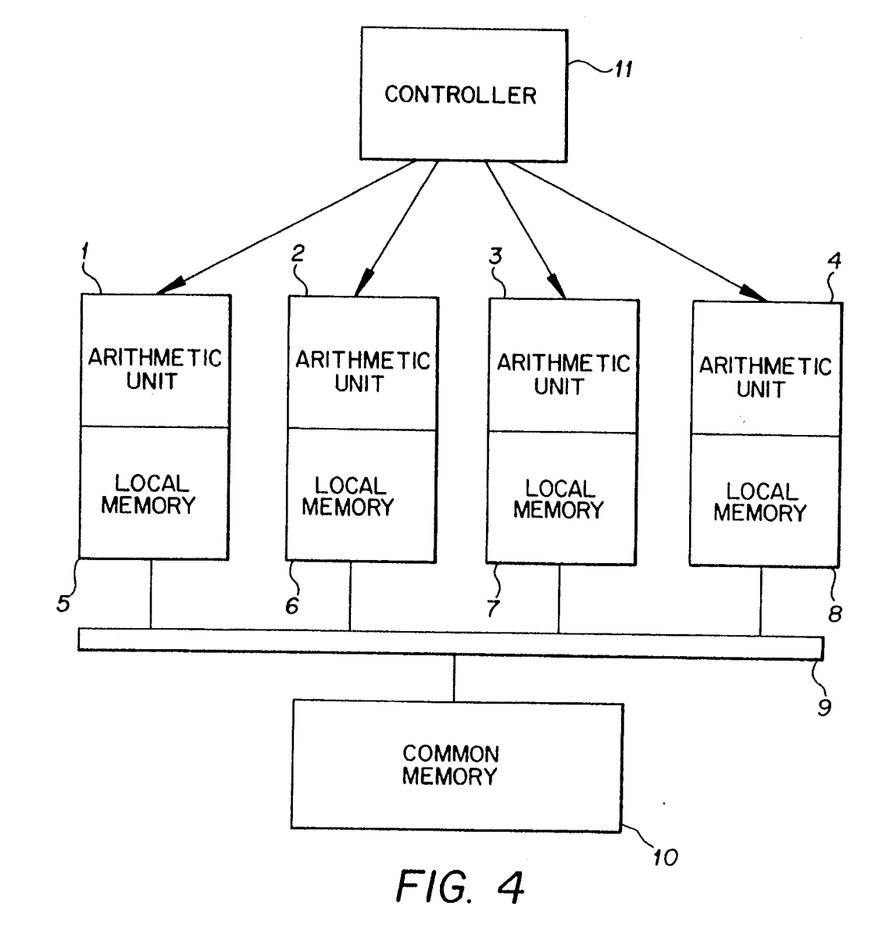
FIG. 4 is a diagram showing the basic configuration of a conventional SIMD type parallel data processing unit.
Figure 5:
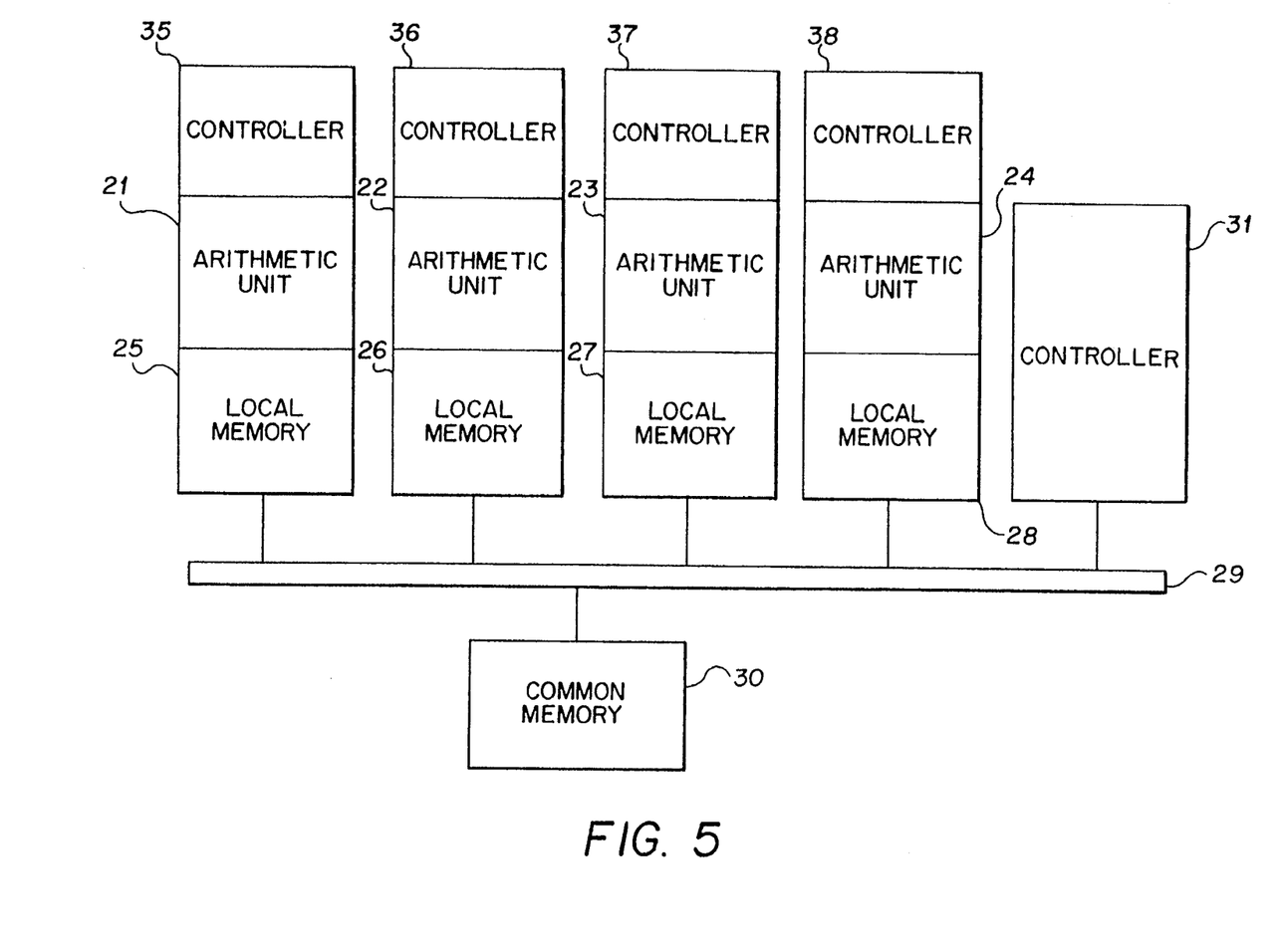
FIG. 5 is a diagram showing the basic configuration of a conventional MIMD type parallel data processing unit.

Referring to FIGS. 4 and 5, there will be shown the basic configuration of a conventional parallel data processing system as proposed in p.111–112 and p.301–476 of *Highly Parallel Computing* (written by G. S. Almasi and A. Gottlieb (Benjamin/Cummings Publishing Company, Inc., 1989). FIG. 4 shows an SIMD (Single Instruction Stream, Multiple Data Streams) type parallel data processing unit having a single instruction stream and multiple data streams, and FIG. 5 shows a MIMD (Multiple Instruction Streams, Multiple Data Streams) type parallel data processing unit having multiple data and instruction streams.

In FIG. 4, reference numerals 1, 2, 3 and 4 are arithmetic units, 5, 6, 7 and 8 local memories, 9 a memory bus, 10 a common memory and 11 a controller for controlling the whole system. In FIG. 5, 21, 22, 23 and 24 are arithmetic units, 25, 26 and 27 local memories, 35, 36, 37 and 38 controllers, 29 a memory bus, 30 a common memory, and 31 a controller for controlling the whole system.

The operation of the system will be described next.

In the SIMD type parallel data processing unit shown in FIG. 4, the same instructions are issued from the system controller 11 where programs are executed to all of the arithmetic units 1 to 4 simultaneously so as to process data stored in each of the local memories 5 to 8. The common memory 10 is accessed through the memory bus 9 in the course of processing when necessary.

Meanwhile, in the MIMD type parallel data processing unit shown in FIG. 5, each program is executed at each of the processor controllers 35 to 38 to issue instructions to each of the arithmetic units 21 to 24, whereby data stored in each of the local memories 25 to 28 are processed. The common memory 30 is also accessed through the memory bus 29 in the course of processing when necessary. The system controller 31 controls synchronization and monitoring operations for the whole system.

Such conventional SIMD and MIMD type parallel data processing units have both advantages and disadvantages. That is, the SIMD type parallel data processing unit has only a single instruction stream with the result that control is simple, thus making large-scale parallel processings easy and extremely high-speed processings possible. However, the unit has the disadvantage of low flexibility in processing and accordingly, is not suitable for complex processings.

On the other hand, each processor of the MIMD type parallel data processing unit operates independently, and consequently, can each perform advanced processings. As a result, control becomes more complex, and the unit is not suitable for large-scale parallel processings.

In this way, the SIMD type and MIMD type parallel data processing units are quite different in the contents of parallel processing, and are each suitable for different application fields. Therefore, it is very difficult to cover a wide variety of application fields with only one of the units.

An explanation is given below, taking particularly important numerical calculation and image processing fields as examples of parallel data processing application fields.

Processing models in the numerical calculation field are roughly divided into (1) particle models typified by Monte Carlo simulation, (2) continuous models for solving partial differential equations such as those representing physical phenomena, and (3) discrete models for solving simultaneous equations such as those for expressing the analysis of networks. Out of these models, the continuous models involve a repetition of a large quantity of regular and local calculations. Therefore, SIMD type large-scale parallel processing is suitable for the models. On the other hand, discrete models do not require large-scale parallelism, but do require complex processing. Therefore, medium-scale MIMD type parallel processing is suitable for these models. Furthermore, as particle models require large-scale and complex processing in most cases, they must be processed by the SIMD and MIMD type parallel processing units depending on conditions and the number of data to be processed.

Next, image processings are roughly classified into (1) the processings of the conversion of density values and pixel units such as conversion into binary units, (2) processings between adjacent pixels such as a spatial filter, (3) general processings such as geometrical transformation and high-speed Fourier transformation, and (4) permeation and tracking type processings such as labelling and the detection of boundaries. Out of these processings, the SIMD type processing unit is suitable for the processings of pixel units and processings between adjacent pixels because they are simple and large-scale processings, while the MIMD type processing unit is suitable for general processings because they are complex and wide-ranging processings. Meanwhile, MIMD and SIMD type processing units must be used properly for the permeation and tracking type processings according to conditions and the number of data to be processed.

In this way, there are various types of processings even in a specific field such as numerical calculation and image processing fields. Therefore, it is very difficult to perform the optimum parallel in one application field with a single parallel processing architecture.

In view of the drawbacks with the prior art, it is an object of the present invention to make it possible to apply to any application field almost the optimum parallel processing architecture which utilizes the advantages of both SIMD and MIMD type units and covers up the disadvantages of each unit.

SUMMARY OF THE INVENTION

In the parallel data processing system according to the present invention, a first parallel data processing unit having a single instruction stream and multiple data streams, that is, an SIMD type parallel data processing unit, is connected to a second parallel data processing unit having multiple instruction streams and multiple data streams, that is, a MIMD type parallel data processing unit, by a common bus and a common memory. A system controller, for enabling each parallel data processing unit to perform its suitable processings, is provided, thus making it possible to apply the optimum parallel processing system to a wide range of fields.

The SIMD type parallel data processing unit is used to perform the simple processings of a large volume of data, while the MIMD type parallel data processing unit is used to perform the complex processings of a small volume of data. Furthermore, it is possible to divide a single program (i.e., an application program to be executed by the data processing system) into modules and to allocate processings to each module, whereby processings suitable for each module can be carried out in parallel or pipeline. These data are transmitted and received through the common memory. That is, in order to achieve high functions and reduce costs, it is more effective to combine these processing units and to complement with each other rather than to expand either one of the units.

In view of the problems in the above numerical calculation and image processing fields, it is an object of the present invention to provide a hybrid parallel data processing system wherein two different SIMD and MIMD type parallel data processing units are connected closely to each other by a common memory and a high-speed multiplex bus, and used as a complement to the other so that efficient parallel processings are possible in a wide range of application fields.

The TRAC (Texas Reconfigurable Array Computer) of the University of Texas and the PASM (Partitionable SIMD/MIMD System) of Purdue University, both of which employ the MSIMD (multiple SIMD) architecture having expanded SIMD and MIMD functions, are examples of a hybrid parallel architecture. However, these systems merely alternate operation between SIMD mode and MIMD mode. Compared with these systems, the system of the present invention has the following features: (1) The system has two separate SIMD and MIMD type parallel data processing units which are the same in scale and connected closely and equally to each other. (2) Each parallel data processing unit has expanded functions, which has been made possible by utilizing the advantages of both SIMD and MIMD type parallel data processing units. (3) The system has a high-speed multiplex bus and a large-capacity, high-speed common memory for efficient data transfer between these parallel data processing units. (4) Hybrid pipeline processings and parallel processings which have been impossible with the conventional parallel data processing systems are possible.

By applying such a hybrid parallel data processing system to large-scale and complex processings such as image processings, processings which have been difficult to be accomplished within an effective time can be performed within a practical time at a high speed.

DESCRIPTION OF THE PREFERRED EMBODIMENT

A preferred embodiment of the present invention will now be described with reference to the accompanying drawings.

Figure 1:
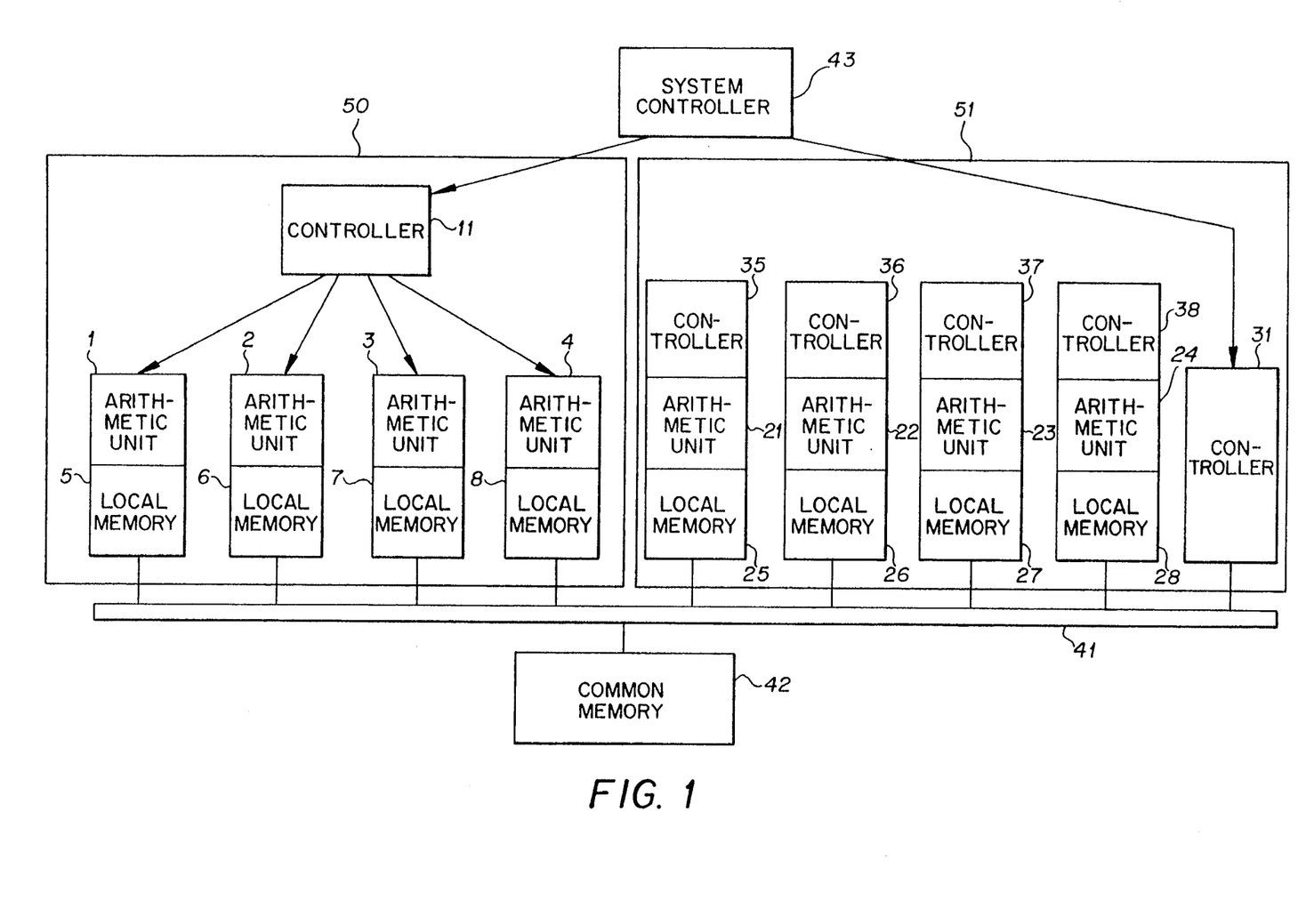
FIG. 1 is a diagram illustrating the configuration of a parallel data processing system according to an embodiment of the present invention.

FIG. 1 is a diagram illustrating the configuration of a parallel data processing system according to an embodiment of the present invention. In the figure, reference numeral 50 is the same SIMD type parallel data processing unit as FIG. 4, and 51 is the same MIMD type parallel data processing unit as FIG. 5. 41 is a common memory bus shared by these units, 42 a common memory also shared by these units and for transmitting and receiving data between these units. 43 is a system controller for allocating each processing to a more suitable one of the parallel data processing units.

The operation of each unit will be described next.

In the system shown in FIG. 1, the execution of application programs is controlled by the system controller 43. Out of the programs, programs suitable for the SIMD type parallel data processing unit, that is, requiring the simple processings of a large volume of data, are allocated to the SIMD type parallel data processing unit 50, while programs suitable for the MIMD type parallel data processing unit, that is, requiring the complex processings of a small volume of data, are allocated to the MIMD parallel data processing unit 51. In this case, these units can be specified by users. A user may also suggest a particular unit, for instance, by using a library. When a user uses a library having a certain function and the library is called, the most suitable parallel data processing unit is specified. Out of the libraries, some are suitable for the SIMD type unit, while others are suitable for the MIMD type unit, depending on functions. However, a suitable parallel data processing unit is automatically selected for the libraries without making users aware of which unit to be used. That is, when the functions of the library are called from user programs, control is transferred to the control program of the system controller 43, and a parallel data processing unit suitable for the function is activated.

Moreover, automatic static distribution and automatic dynamic distribution are performed as well. The automatic static distribution is first performed when which parallel data processing unit is suitable can be judged through the analysis of user programs. In this case, a compiler automatically selects a suitable parallel data processing unit for execution. When the volume of data and the number of repeated calculations are variable, and the optimum distribution cannot be judged upon execution only, the control program of the system controller 43 automatically judges upon execution, and the optimum dynamic distribution is carried out. To perform this automatic dynamic distribution, the compiler embeds in user program codes for delivering necessary information to the control program.

Furthermore, the same processing may be made on the same data using these two different types of parallel data processing units at the same time. This forms a duplex system through the simultaneous use of different algorithms for making the same processing on the same data and through the comparison of these results, thus making it possible to construct a highly reliable system.

Large-scale parallel processings and pipeline processings are possible within a single program using both of the SIMD type parallel data processing unit 50 and the MIMD type parallel data processing unit 51. At this time, these processings are controlled by the system controller 43, and data are transmitted and received by the common memory 42 through the memory bus 41. Therefore, the memory bus 41 needs to be fast.

In the embodiment described in the foregoing, each parallel data processing unit consists of four processors. Generally, the SIMD type parallel data processing unit has a large number of processors, while the MIMD type unit has a relatively small number of processors. The ratio of processors for the SIMD type to those for the MIMD is determined by the performance of each processor and the nature of an application program.

To separate the bus 41 temporarily or to provide two or more buses is effective for large-scale parallel processings and pipeline processings using both of the parallel data processing units described in the foregoing.

As described in the foregoing, according to the present invention, the SIMD type and MIMD type parallel data processing units are connected to each other so that each unit can carry out its suitable processings. As a result, more appropriate parallel processings can be performed in a wide range of application fields effectively by combining both units rather than expanding and applying either one of the SIMD and MIMD type-units to a wide range of fields, thus making it possible to enhance performance and reduce costs.

Figure 2:
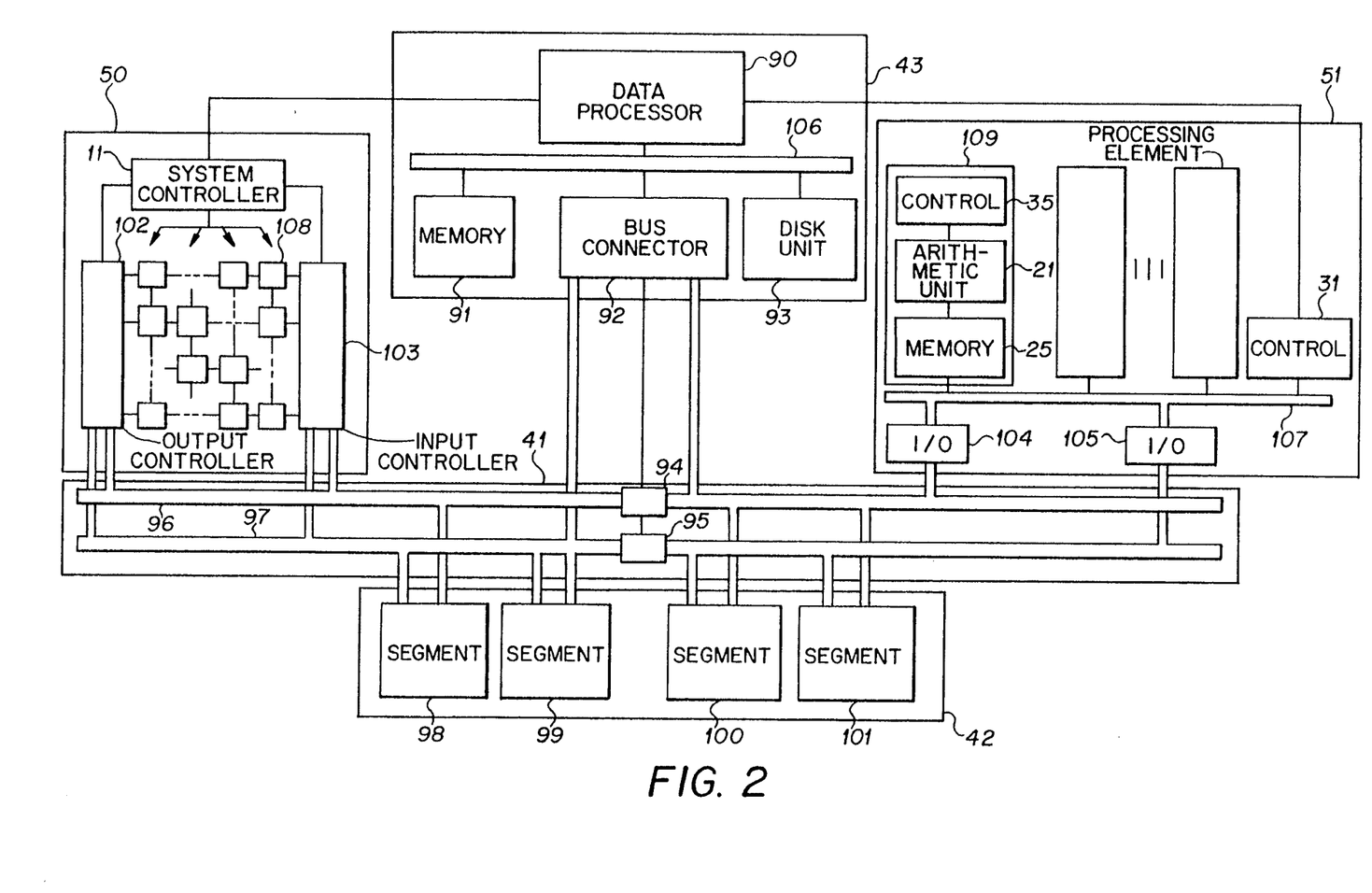
FIG. 2 is a diagram showing the configuration of an example of the system to which the present invention maybe applied.

A parallel data processing system to which the present invention is applied to is shown in FIG. 2. The system is the same as FIG. 1 in basic configuration, but further details on each block are shown.

In FIG. 2, 41, 42, 43, 50 and 51 indicate, respectively, a common memory bus, common memory, system controller, SIMD type parallel data processing unit, and MIMD type parallel data processing unit, respectively.

The common memory bus 41 consists of two buses 96 and 97 and connectors 94 and 95 for connecting these buses. The reasons for the provision of such a multibus are to avoid a competition in access to the common memory 42 from the two parallel data processing units 50 and 51, and to perform data input/output from the system controller 43 and calculations simultaneously. In a normal mode, all signals connected to the buses can use an unused bus, and either one of the parallel data processing units can use both of the buses at the same time for data input and output. These two buses 96 and 97 are connected to each other by the bus connectors 94 and 95. The bus connectors 94 and 95 have a switching function to separate the buses 96 and 97 from and connect them to the SIMD type parallel data processing unit 50 and the MIMD type parallel data processing unit 51. This switching function is achieved by a selector. Upon connection, both buses are directly connected to the respective processing units, and upon separation, they are connected to the bus terminating resistors at the both ends of the bus connectors 94 and 95 so that these two buses can be used as an independent bus for each of the two parallel data processing units 50 and 51. The bus connectors 94 and 95 control connection and separation according to a signal from the system controller 43.

The common memory 42 is generally divided into a plurality of segments. FIG. 2 shows the common memory which is divided into four segments. Each of the segments 98, 99, 100 and 101 has a capacity of 16M bytes and is connected to the common memory bus 41, separately. When the common memory 42 is used, segment number and address are specified. Ordinary user programs use logical segment numbers, and correspondence between the logical segment numbers and physical segment numbers is performed by the system controller 43. Each segment has an address calculation function, and the two parallel data processing units 50 and 51 can perform high-speed data transfer with the common memory 42 by eliminating the use of the bus by extra address information, thus further enhancing the effects of the present invention.

The system controller 43 includes a data processor 90, a memory 91, a bus connector 92, a disk unit 93 and an internal bus 106. Generally speaking, user programs are processed by the data processor 90 and stored in the memory 91. Data to be processed are stored in the disk unit 93 and transferred to the common memory 42 through the common memory bus connector 92. Then, the data are processed by either one of the parallel data processing units 50 and 51. The processed data are stored in the disk unit 93 through the bus connector 92.

The SIMD type parallel data processing unit 50 includes a system controller 11, an output controller 102, an input controller 103 and 4096 processing elements 108. Each processing element 108 consists of an 8-bit arithmetic unit (not shown) and a 16K-bit local memory (not shown), and is connected to other four adjacent processing elements because of a lattice configuration. Each arithmetic unit comprises an 8-bit adder-subtractor, a plurality of control flags, a 128-bit register file and the like (See U.S. Pat. No. 4,858,110, the disclosure of which is hereby incorporated by reference). The control of the whole SIMD type parallel data processing unit 50 is performed by the system controller 11, from which the same instructions are issued to all the processing elements 108 at the same time. Data to be processed are transmitted from the common memory 42 to each of the processing elements 108 through the input controller 103 in response to instructions from the system controller 11. In addition, processed data are returned to the common memory 42 through the output controller 102. It is possible to overlap data input/output with calculations, whereby pipeline data processings for each block of data can be made faster, thus making the present invention more effective. (Patent Application No. 59-29485, Patent Publication No. 1-26108) Due to these functions, SIMD type parallel processing is effected, thus making possible the parallel processing of a large volume of data.

The MIMD type parallel data processing unit 51 consists of a system controller 31, input/output controllers 104 and 105, eight processing elements 109 and a bus 107 for connecting these. Each processing element 109 has a 32-bit arithmetic unit 21, a 1MB local memory 25 and a controller 35, and can execute a different string of instructions. The MIMD parallel data processing unit 51 is wholly controlled by the system controller 31, from which a string of instructions to be executed is transmitted to each processing element 109 for control. In addition, data to be processed are transmitted from the common memory 42 to each processing element 109 through either one of the input and output controllers 104 and 105 in response to instructions from the system controller 31. Then processed data are returned to the common memory 42 through either one of the input and output controllers 104 and 105.

Figure 3:
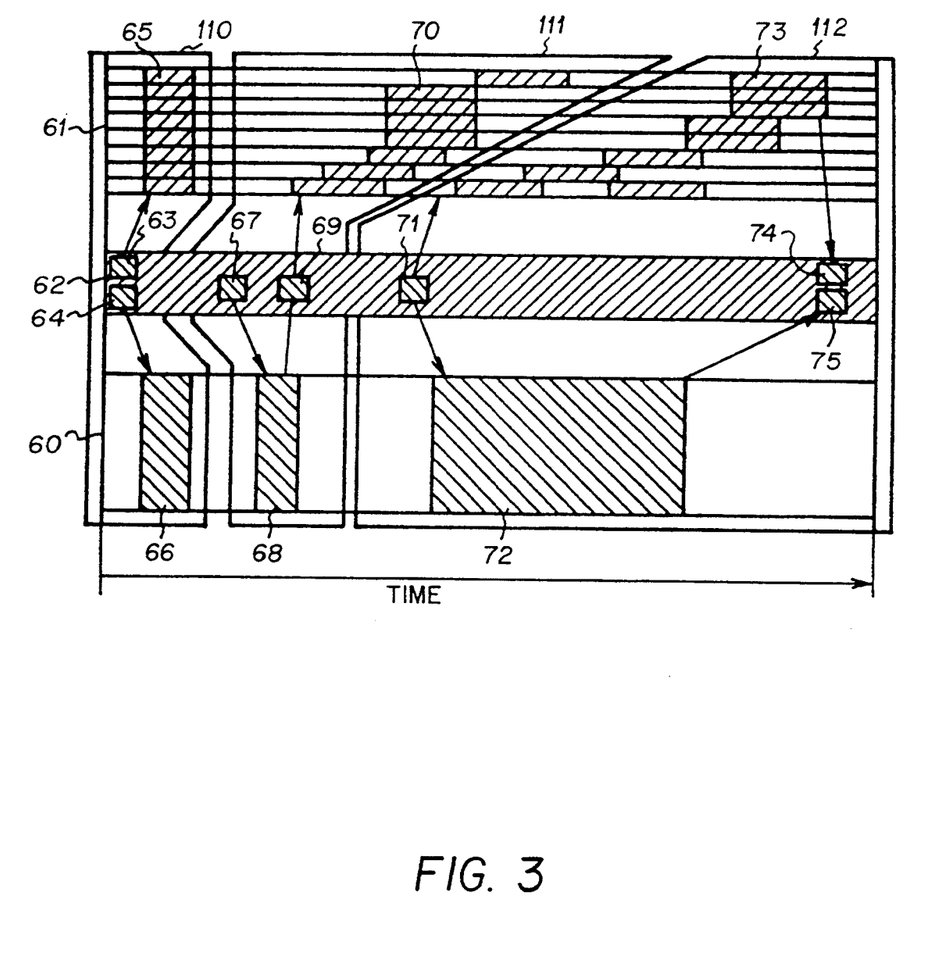
FIG. 3 is a diagram showing the parallel processing flow of the present invention.

Next, four different parallel processings which are made possible by the present invention will be described in conjunction with FIG. 3. FIG. 3 illustrates each parallel processing flow along the elapse of time in the system shown in FIG. 2. Basically, there are two parallel processing flows produced by the two parallel data processing units 50 and 51. 60 indicates a large number of small SIMD type parallel processing flows produced by 4096 processing elements 108 of the SIMD type parallel data processing unit 50. 66, 68 and 72 indicate portions where calculations are carried out by the SIMD type parallel data processing unit 50. 61 indicates high-function and highly flexible MIMD type parallel processing flows produced by eight processing elements 109 of the MIMD type parallel data processing unit 51. 65, 70 and 73 are portions where calculations are performed by the MIMD type parallel data processing unit 51. 62 indicates data within the common memory, and 63, 64, 67, 69, 71, 74 and 75 each indicate data to be accessed. 110, 111 and 112 indicate the hybrid processing flows of the SIMD and MIMD type parallel data processing units 50 and 51.

Individual parallel processing flows 60 and 61 were each separately available. Either one of the processing flows was used, but the present invention makes it possible to produce new parallel processing flows peculiar to hybrid parallel processing which combines these parallel processing flows. That is, an embodiment of the present invention can utilize the following three different types of parallel processings which have been impossible with the conventional system.

(1), One or mere programs which are executed by the system controller 43 makes it possible to use the SIMD type parallel data processing unit 50 and the MIMD type parallel data processing unit 51 independently and simultaneously in order to process different data 63 and 64 within the common memory. 110 indicates such a hybrid parallel processing. Due to this function, different types of parallel processings can be used simultaneously with the same procedure within a single system. In the conventional system, different systems must be used to utilize different types of parallel processing methods, and the procedure for each processing method is different.

(2) 111 indicates a hybrid parallel processing wherein the two parallel data processing units 50 and 51 are used for the pipeline processing of each series of continuous data sets (for example images). Data 67 within the common memory are used, and the SIMD type parallel data processing unit 50 carries out the first processing 68 on the data. The results of the processing are delivered to the MIMD type parallel data processing unit 51 through the common memory (data 69), and then a different parallel processing 70 is made on the data. To perform this processing, the system controller 43 controls synchronization and data sets. Data are transmitted and received between the two parallel data processing units 50 and 51 through the common memory 42. To minimize the overhead, the common memory buses 96 and 97, and the segments 98, 99, 100 and 101 of the common memory 42 are each used by the parallel data processing units 50 and 51 independently. As a result, a target processing is further divided into function levels, and the parallel data processing unit suitable for each function is used to perform the no-waste pipeline processing of each data set.

(3) 112 indicates a hybrid parallel processing which is made possible by the independent and parallel operation of the two parallel data processing units 50 and 51. In this case, the SIMD type parallel data processing unit 50 uses data 71 within the common memory to carry out a processing 72 and at the same time, the MIMD type parallel data processing unit 51 uses the same data 71 to carry out a different parallel processing 73. In this case, different programs may operate independently on each of the parallel data processing units 50 and 51, or a parallel processing using different parallel algorithms may be made on the same data set within the same program. Since such a parallel processing makes it possible to carry out different parallel processing modes different in algorithm, convergence, accuracy and parallelism on the same data simultaneously, reliability can be enhanced through the comparison of results, and performance can be improved using the first results. Such processings are not possible with the conventional system, but are special to the hybrid method.

As described in the foregoing, according to the present invention, new parallel processings special to hybrid type parallel processing are possible with the result that the application range of parallel processings can be made spatially and temporarily wider than the conventional system.

An example of a software configuration of the present invention will be shown next. According to the present invention, a parallel processing library to be used by users and system control software for controlling hybrid processings using the two parallel data processing units 50 and 51, and the common-memory 42 are provided.

First, the parallel processing library is provided to allow users to use the two parallel data processing units 50 and 51 easily. Generally, the library is prepared and registered for a suitable parallel data processing unit. In some cases, two separate libraries using different algorithms for each of the parallel data processing units are prepared for the same processing. Users usually use these libraries to operate the two parallel data processing units 50 and 51 in response to a subroutine call from user programs which operate on the system controller 43. Which parallel data processing unit to be used can be specified in advance or an appropriate parallel data processing unit is activated through the recognition of the system controller 43 when the library is specified. In addition, users can describe directly an execution library for either one of the parallel data processing units. In spite of great restrictions, a compiler is effective for tile automatic specification of a suitable one of the parallel data processing units and the replacement of user programs with parallel libraries.

Meanwhile, the system control software for effecting hybrid parallel processings of the present invention has the following functions: (i) parallel and pipeline control of the two parallel data processing units 50 and 51, (ii) overlap control of data transfer between each of the parallel data processing units 50 and 51 and the common memory 42, (iii) access to a suitable parallel data processing unit without making users aware of it., (iv) monitoring of spatial and temporal parallel processing operations of the whole system.

To achieve these functions, the system control software performs various managements as well as the simultaneous execution and exclusive control of components thereof. That is, (i) resource management of the two parallel data processing units 50 and 51, (ii) data management of a plurality of segments of the common memory 42, (iii) management of parallel processing libraries, (iv) execution control of parallel processing libraries, and (v) data input/output management of the common memory 42.

An application example of the present invention to image processing will be described next. As described previously, there are a variety of image processings and there are some classification methods. From the viewpoint of parallel processing, they are roughly classified into: (1) neighborhood processings: processings of making relatively simple calculations unformly between pixels or adjacent pixels, and (2) general processings: processings of making relatively complex calculations for a whole image.

In this way, to execute these two different types of processings in parallel at a high speed and at a high efficiency, in the present invention, the neighborhood processings are substantially allocated to the SIMD type parallel data processing unit 50, while the general processings are allocated to the MIMD type parallel data processing unit 51, thus-making possible efficient parallel processings in a wide range of application fields. Therefore, more appropriate parallel processings can be applied in a temporarily and spatially wider range of fields by using each of the two parallel data processing units properly. The application of hybrid parallel processings by further splitting each processing makes it possible to perform the upmost parallel processings in a still wider range of application fields. The effect of the present invention on performance will be described below.

The effects of the present invention on calculation, function and application program levels will be described, using image processing as an example.

First, in the evaluation of the calculation level, the SIMD type parallel data processing unit 50 is generally configured in such that it is suitable for the calculations of integral numbers and the processings of short bit-length data. The unit can exhibit super high-speed performance due to large-scale parallel processing. On the other hand, it is difficult for the MIMD type parallel data processing unit 51 to effect large-scale parallel processings due to the restrictions of arithmetic units, but is suitable for floating point calculations and complex processings.

In image processing, a wide variety of data from several-bit integral number data to 32-bit real number data are handled according to type of processing. The maximum performance of the processor can be achieved by selecting the number of arithmetic units according to the contents of processing and data to be processed. Generally speaking, the SIMD type parallel data processing unit 50 can exhibit higher performance in the processing of short bit-length integral number data, while the MIMD type parallel data processing unit 51 can exhibit higher performance in the processing of long bit-length real number data. Therefore, the maximum performance can be achieved from parallel processing by selecting the most suitable parallel data processing unit according to type of processing.

As an example of performance at tile function level, the relative performance ratio of the SIMD type data processing unit 50 and the MIMD type parallel data processing unit 51 will be shown for five typical image processings. In the system structured as shown in FIG. 2, the ratio is 1:5 for affin transformation, 1:4 for histogram creation, 2:1 for the conversion of density values, 3:1 for high-speed Fourier transformation, and 6:1 for uniformly weighted filters. A difference in performance between these units is 2 to 6 times. The SIMD type parallel data processing unit 50 and the MIMD type parallel data processing unit 51 used in the evaluation of performance are almost the same in hardware volume. Therefore, it is easily understood that using a hybrid parallel processing architecture as in the present invention is more efficient than using a single parallel processing architecture.

Finally, in the evaluation of performance at the application program level, the present invention was evaluated on a series of practical level image processings of data from an optical sensor on board an artificial satellite. As a result, the performance was 2.6 to 2.8 times higher than when using a single parallel data processing unit, thus proving the effectiveness of the present invention.

Industrial Applicability

The adoption of a hybrid parallel processing architecture according to the present invention makes it possible to greatly widen the applicable range of parallel processing spatially and temporarily compared with a single architecture. As a result, appropriate parallel processings can be dynamically applied to each of a wide variety of image processings. Therefore, processings which could not be accomplished by a conventional computer within an effective time, such as the processings of large-scale and complex image data, can be performed within a practical time at a high speed.

What is claimed is:

1. A parallel data processing system comprising:
   a first parallel data processing unit, including a number of interconnected processing elements of a first type and that is directable to execute a single stream of instructions on multiple streams of data, wherein each processing element is capable of storing a quantity of data and of processing an amount of data per unit time;
   a second parallel data processing unit, including a number of interconnected processing elements of a second type and that is directable to execute multiple streams of instructions on multiple streams of data, wherein each processing element is capable of storing a quantity of data and of processing an amount of data per unit time;
   a common bus and a common memory connecting said first and second processing units;
   a system controller having means for directing the first unit to execute the single stream of instructions on multiple streams of data and for directing the second unit to execute the multiple streams of instructions on multiple streams of data;
   wherein the quantity of data storable in the first type of processing element is less than the quantity of data storable in the second type of processing element;
   wherein the amount of data processable per unit time by the first type of processing element is less than the amount of data processable per unit time in the second type of processing element; and
   wherein the number of processing elements of the first type exceeds the number of processing elements of the second type.

2. A parallel data processing system according to claim 1, wherein said common bus is a high-speed multibus which can be used by each of the parallel data processing units independently, said common memory is a large-capacity high-speed common memory comprising a plurality of segments, each segment being connected to said multibus, said system controller has a data processor for processing user programs, a memory for storing said programs, a disk unit for storing data to be processed, and bus connectors for connecting the controller to said multibus and an internal bus for connecting the data processor, memory, disk unit and bus connector, and said first and second parallel data processing units include input/output controllers for controlling the input and output of data from said multibus.

3. A parallel data processing system according to claim 1 or claim 2, wherein
each of said parallel data processing units is used independently, and operations are performed concurrently by the two processing units on different data within said common memory.

4. A parallel data processing system according to claim 1 or claim 2 wherein a series of continuous data sets are processed first by the first parallel data processing unit and second by the second parallel processing unit in a sequential pipeline fashion.

5. A parallel data processing system according to claim 1 or claim 2, wherein said parallel data processing units are operated concurrently and independently on the same data within said common memory.

6. A parallel data processing system according to claim 1 or claim 2, wherein said system controller allocates neighborhood processings for making calculations between pixels to the first parallel data processing unit, and allocates general operations for making calculations for a whole image to the second parallel data processing unit.

7. A parallel data processing system comprising:
a first parallel data processing unit, including a number of interconnected processing elements of a first type and that is directable to execute a single stream of instructions on multiple streams of data, wherein each processing element has a memory capable of storing a number of bits and an arithmetic unit capable of processing a number of bits per instruction;

a second parallel data processing unit, including a number of interconnected processing elements of a second type and that is directable to execute multiple streams of instructions on multiple streams of data, wherein each processing element has a memory capable of storing a number of bits and an arithmetic unit capable of processing a number of bits per instruction;

a common bus and a common memory, connecting said first and second processing units;

a system controller having means for directing the first unit to execute the single stream of instructions on multiple streams of data and for directing the second unit to execute the multiple streams of instructions on multiple streams of data, and for controlling execution of an application program, the application program containing a function including means for specifying a data processing unit; and said system controller including means, responsive to a specification of a data processing unit, for executing the function including said specification on the specified processing unit;

wherein the number of bits per instruction processable by the arithmetic unit in the first type of processing element is less than the number of bits per instruction processable by the arithmetic unit in the second type of processing element.

8. A parallel data processing system as set forth in claim 7, further comprising means for temporarily separating the bus from at least one of the first and second parallel data processing units.

9. A parallel data processing system as set forth in claim 7, further comprising at least a second common bus, and wherein said means for separating the bus includes a connector for each bus for connecting the bus to at least one of the first and second parallel data processing units; and
a selector, responsive to a signal from the system controller, for switching and connecting the connectors to one of said common buses and one of the first and second data processing units.

10. A parallel data processing system as set forth in claim 7, further comprising bus terminating resistors for terminating a separated bus.

11. A parallel data processing system as set forth in claim 7, wherein said common memory is addressable by a logical segment number and an address, and
wherein the system controller performs correspondence between the logical segment numbers and physical segment numbers.

12. A parallel data processing system as set forth in claim 7, wherein said system controller comprises:
a data processor for processing an application program;
a memory for storing the application program and data;
a bus connector for connecting the system controller to the common bus; and
an internal bus for allowing communication between the data processor, memory, and bus connector;
said data processor including means for transferring data from the memory to the common memory through the common bus.

13. A parallel data processing system as set forth in claim 7, wherein the first parallel data processing unit comprises:
a plurality of processing elements, wherein adjacent elements are interconnected by a lattice configuration;
a system controller for issuing an instruction to said processing elements simultaneously;
an input/output controller for transferring data between the common memory and the processing elements in response to instructions from the system controller.

14. A parallel data processing system as set forth in claim 13, wherein the processing element comprises an arithmetic unit and a local memory for holding data accessible by the arithmetic unit.

15. A parallel data processing system as set forth in claim 14, wherein the arithmetic unit comprises an adder/subtractor, a register for storing data and a plurality of control flags for controlling operation of the adder/subtractor.

16. A parallel data processing system as set forth in claim 7, wherein the second data processing unit comprises:
a plurality of processing elements; and
a system controller for issuing a string of instructions to each of said processing elements; and an input/output controller for transferring data between the common memory and the processing elements in response to instructions from the system controller.

17. A parallel data processing system as set forth in claim 16, wherein the processing unit comprises:
an arithmetic unit;
a local memory for storing data accessible by the arithmetic unit; and
a controller for executing a string of instructions on the arithmetic unit in response to the system controller.

18. A parallel data processing system as set forth in claim 7, wherein said first and second data processing units are respectively connected to a common memory via first and second common buses, and respectively use separate segments of the common memory.

19. A parallel data processing system as set forth in claim 7, wherein the first parallel data processing unit uses data from the common memory to execute a function and wherein the second parallel data processing unit uses said data to perform a different function simultaneously.

20. A parallel data processing system as set forth in claim 7, wherein the system controller manages resources of the first and second parallel data processing units, manages data within segments of the common memory, manages input and output of data between the common memory and the parallel data processing units so as to enable parallel and pipeline control of the first and second parallel data processing units in a manner transparent to the user.

21. The parallel data processing system as set forth in claim 7, wherein the means responsive to a specification is a control program.

22. The parallel data processing system as set forth in claim 21, wherein the means for specifying are codes embedded in the application program by a compiler for delivery to the control program during execution.

23. The parallel data processing system of claim 7, wherein the number of processing elements of the first type exceeds the number of processing elements of the second type.

24. The parallel data processing system of claim 23, wherein the quantity of data storable in the first type of processing element is less than the quantity of data storable in the second type of processing element.

25. The parallel data processing system of claim 7,
wherein the number of processing elements in the first unit exceeds the number of processing elements in the second unit by at least two orders of magnitude,
wherein the number of bits storable in the memory of the second type of processing element exceeds the number of bits storable in the memory of the first type of processing element by at least two orders of magnitude,
wherein the number of bits processable per instruction of the arithmetic unit of the second processing element exceeds the number of bits per instruction of the arithmetic unit of the first processing element by at least a factor of two, and
wherein the product of the number of processing elements in the first unit, the number of bits in the memory of the first type of processing element, and the number of bits per instruction of the arithmetic unit of the first processing element equals to within one order of magnitude the product of the number of processing elements in the second unit, the number of bits in the memory of the second type of processing element, and the number of bits per instruction of the arithmetic unit of the second processing element.

* * * * *